Feb. 1, 1944. G. P. SCHWABACHER 2,340,703
METAL STRAIN RELIEF
Filed May 1, 1943
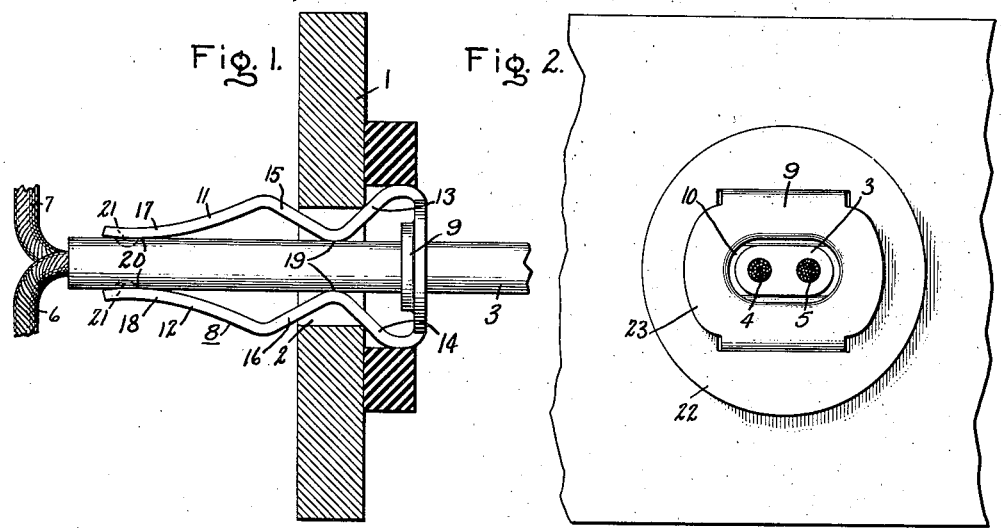
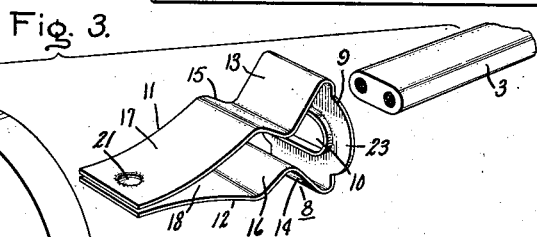
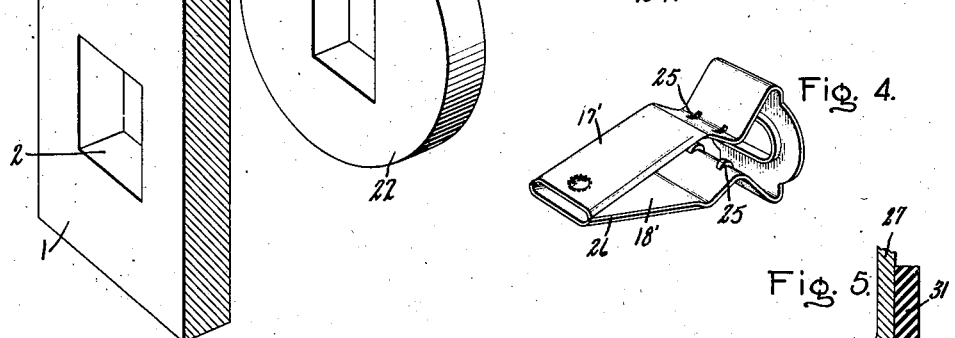
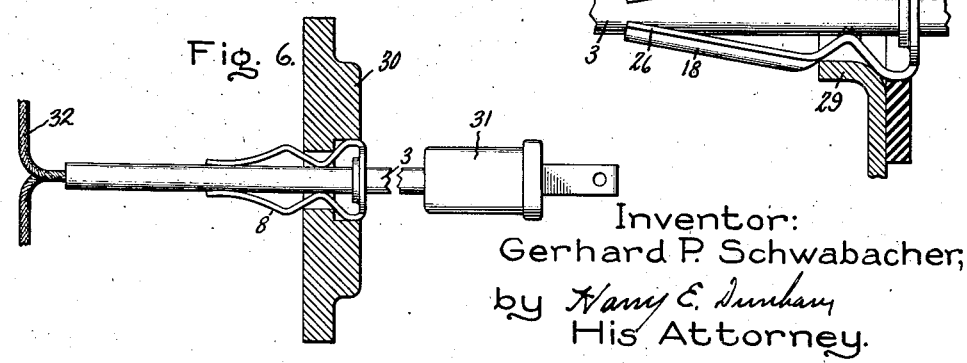
Inventor:
Gerhard P. Schwabacher,
by Harry E. Dunham
His Attorney.

Patented Feb. 1, 1944

2,340,703

UNITED STATES PATENT OFFICE 2,340,703

METAL STRAIN RELIEF

Gerhard P. Schwabacher, Bridgeport, Conn., assignor to General Electric Company, a corporation of New York Application May 1, 1943, Serial No. 485,387

3 Claims. (Cl. 173—322)

In connection with electrical apparatus wherein an electric cord passes through an opening in a wall or panel and is electrically connected to terminals, it is known to provide between the wall and the cord means for anchoring the cord so that any pull on it will be taken by the anchoring means and the wall and not transmitted to the connections. My invention relates to such an anchoring means, termed usually a strain relief, and has for its object to provide an improved strain relief which is simple in structure, capable of being manufactured at low cost and easily applied, and which, at the same time, functions in a satisfactory manner.

For a consideration of what I believe to be novel and my invention, attention is directed to the following specification and to the claims appended thereto.

In the drawing, Fig. 1 is a sectional view of a wall having an opening through which an electric cord passes, the cord being equipped with improved strain relief means embodying my invention; Fig. 2 is a face view of the construction shown in Fig. 1; Fig. 3 is an exploded view of the parts shown in Figs. 1 and 2; Fig. 4 is a detail sectional view showing a modified form of strain relief clip; Fig. 5 is a view similar to Fig. 1 of a further modification of my invention, and Fig. 6 is a sectional view of another modification.

Referring to the drawing, 1 indicates a wall provided with a rectangular opening 2 for the passage of an electric cord 3. In the present instance, an electrical cord of a flat type is shown, the two conductors 4 and 5 of the cord being side by side, as shown particularly in the sectional view of Fig. 2. The wall 1 may be, for example, a wall of a housing in which electrical apparatus is mounted or it may be, for example, a panel on which electrical apparatus is mounted. In Fig. 1, 6 and 7 indicate the ends of the electrical conductors which are to be connected to the electrical apparatus. The other end of cord 3, i. e., the end outside the casing or panel, may be of suitable length and may have an electric plug on its end for connecting it to an electric circuit.

On cord 3 is a metal clip 8 comprising a head 9 provided with an opening 10 through which the cord extends and two angularly projecting arms 11 and 12 which extend along opposite sides of the cord. Opening 10 is of a size such that the cord passes freely therethrough. Arms 11 and 12 are bent inwardly to form angularly extending portions 13 and 14 and are then bent outwardly again to form angularly extending portions 15 and 16. Beyond portions 15 and 16, the arms are bent inwardly at a relatively small angle to form angularly extending portions 17 and 18. The apexes of angularly extending portions 13, 15 and 14, 16 approach each other and are adapted to engage the cord 3 on opposite sides as is indicated at 19. The ends of angularly extending portions 17 and 18 are adapted to engage the cord, as indicated at 20. The arms 11 and 12 are formed of suitable spring metal and are biased toward each other by their inherent springiness, as is indicated in Fig. 3. Accordingly, when a cord is located between them, they grip it tightly. If desired, the ends may be provided with inwardly extending projections or beads 21 for biting into the insulation on the cord so that the ends more firmly grip the cord. The angularly extending portions 13, 15 and 14, 16 form transverse grooves or depressions into which the wall 1 at the edge of the opening fits, as is shown clearly in Fig. 1. The portions 17 and 18 extend at a relatively small angle with respect to each other while the portions 13 and 15 extend at relatively greater angles with respect to each other.

In the use of the invention, the clip is mounted on the cord by feeding the end of the cord through opening 10 in head 9 and on until it projects the desired distance beyond the ends of arms 11 and 12. The cord is gripped by the clip at two spaced points, at the point between the apexes of the portions 13, 15 and 14, 16 and at the point where it passes between the free ends of the arms. Thus, the clip is firmly seated on the cord. It is the practice in connection with electrical apparatus to provide the manufacturer of the apparatus with cord sets, a cord set comprising a length of cord having a plug on one end and the other end suitably stripped of insulation to provide bare conductor lengths for connection to the electrical apparatus. A clip embodying my invention may be mounted on each cord set by the cord set manufacturer. When the cord set is to be used, the end of the cord is started through the opening 2 in the wall 1 and pulled through from right to left, as shown in Fig. 1. The sloping portions 17 and 18 of the clip engage the edge of opening 2 and in being pulled along will be compressed, permitting the end of the clip to ride through the opening after which the arms spring outwardy to clamp the clip in the opening, as shown in Fig. 1. Portions 17 and 18 have a slope low enough so that as the clip is pulled through the opening to compress such portions, their ends readily slide forward along the cord. The shape of portions 13, 15 and 14, 16 relatively to each other is such that the edge of opening 2 fits well down into the valley between them to engage and hold the clip in the opening. The cord is now firmly gripped by the clip and the clip is firmly anchored in the wall. A pull on the right hand end of the cord, as shown in Fig. 1, results in the angular portions 14 and 15 being pressed against the edges of opening 2 to still more firmly clamp the wire between the arms 11 and 12. As a result, any pull on the cord serves to clamp it more firmly in the opening. The head 9 of the clip may be generally oval in shape, as shown in Fig. 2. To cover the edges of opening 2 and give a finished appearance, a suitable colored washer 22 of fiber or other suitable material may be provided, it being held in place by ears 23 on opposite sides of the head.

In addition to the beads 21, the apexes between walls 13, 15 and 14, 16 may be provided with inwardly projecting beads to bite into the insulation on the cord. Such an arrangement is shown in Fig. 4 wherein 25 indicates such beads. Also, in the arrangement shown in Fig. 4, the sides of the portions 17' and 18', corresponding to portions 17 and 18 of Figs. 1 to 3, are provided with inwardly turned edges 26, thus providing a curved end which conforms to the shape of the cord and serves to bite into the cord. The clip of Fig. 4 is shown in Fig. 5 as being mounted in a wall 27. Wall 27 is illustrated as being of relatively thin metal. To provide for holding the clip in place, the opening 28 through the wall, corresponding to opening 2 of Fig. 1, is provided with a surrounding flange 29. This, in effect, provides a thickened wall at the opening. The essential thing is that there shall be sufficient wall thickness surrounding the opening to properly engage with the opposite surfaces of the clip. In Fig. 5, a washer 31, similar to washer 22 shown in Fig. 1, is provided. In Fig. 6, a separate washer has been omitted, it being replaced by a boss 30 formed integral with the wall. Also in Fig. 6, 31 indicates a plug on the end of the cord for connection to a plug receptacle. At its other end cord 3 is stripped to provide bared ends 32 for connection to an electrical device.

A clip embodying my invention may be made from suitable thin spring strip metal, being stamped out and bent to shape in a single operation, the metal being of a character such that it has the needed resiliency. Accordingly, it can be manufactured at low cost and likewise assembled on the cord at low cost. Similarly, it can be quickly and easily mounted in an opening in a panel or wall. As a result, my strain relief can be provided at low cost. At the same time, it serves effectively to anchor the cord in the opening.

While I have illustrated my invention in connection with a flat cord, it is to be understood that it is not limited necessarily to use with such cord but may be used in connection with cords of other shapes. Also, the invention is not limited necessarily to the anchoring of electric cord as it may be used wherever found applicable. By the use of the term "cord" I intend to include not only electric cord but any like member in connection with which my invention may find use.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. The combination with a wall having an opening and a cord passing through the opening of means for anchoring the cord in the opening comprising a clip having a head provided with an opening through which the cord passes and spaced arms projecting from the head on opposite sides of the cord, said arms adjacent to the head being reversely bent toward each other to provide apexes between which the cord is gripped and valleys in which edges of the opening are located, and the free ends of the arms extending along the cord and gripping it at their extremities.

2. The combination with a wall having an opening and a cord passing through the opening of means for anchoring the cord in the opening comprising a clip having a head provided with an opening through which the cord passes and spaced arms projecting from the head on opposite sides of the cord, said arms adjacent to the head being reversely bent toward each other to provide apexes between which the cord is gripped and valleys in which edges of the opening are located, and the free ends of the arms extending along the cord and gripping it at their extremities, and a washer surrounding the opening in the wall and held in position against the surface of the wall by the head end of said clip.

3. The combination with a wall having an opening and a cord passing through the opening of a spring clip for anchoring the cord in the opening comprising a head of larger size than the wall opening and having an opening for the passage of the cord and arms extending from the head through said wall opening, said arms being reversely bent toward each other adjacent to the head to provide apexes which grip the cord and valleys in which edges of the wall opening are positioned, the free ends of the arms gripping the cord at a point spaced from said apexes and being shaped to permit of the ends being pulled through the wall opening.

GERHARD P. SCHWABACHER.